(12) United States Patent
Miller et al.

(10) Patent No.: US 6,226,759 B1
(45) Date of Patent: May 1, 2001

(54) METHOD AND APPARATUS FOR IMMEDIATE DATA BACKUP BY DUPLICATING POINTERS AND FREEZING POINTER/DATA COUNTERPARTS

(75) Inventors: Donald Lee Miller; Mark Anthony Sovik, both of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/162,333

(22) Filed: Sep. 28, 1998

(51) Int. Cl.[7] .............................. G06F 12/02; G06F 11/00; G06F 13/00
(52) U.S. Cl. ................................. 714/6; 707/204; 711/162
(58) Field of Search .......................... 714/5, 6; 711/161, 711/162, 100, 112; 707/204, 205; 360/15; 369/47

(56) References Cited

U.S. PATENT DOCUMENTS

| | | | |
|---|---|---|---|
| 4,907,150 | 3/1990 | Arroyo et al. | 364/200 |
| 5,226,157 | 7/1993 | Nakano et al. | 395/600 |
| 5,327,551 | 7/1994 | Kaneko | 395/575 |
| 5,379,391 | * 1/1995 | Belsan et al. . | |
| 5,410,667 | 4/1995 | Belsan et al. | 395/425 |
| 5,502,836 | 3/1996 | Hale et al. | 395/497.01 |
| 5,530,801 | 6/1996 | Kobayashi | 395/182.11 |
| 5,625,817 | 4/1997 | Wood et al. | 395/614 |
| 5,649,152 | 7/1997 | Ohran et al. | 395/441 |
| 5,664,088 | 9/1997 | Romanovsky et al. | 395/182.11 |
| 5,712,971 | 1/1998 | Stanfill et al. | 395/183.1 |
| 5,715,386 | 2/1998 | Fulton, III et al. | 395/183.14 |
| 6,038,639 | * 3/2000 | O'Brien et al. . | |

* cited by examiner

*Primary Examiner*—Gopal C. Ray
(74) *Attorney, Agent, or Firm*—Dan Hubert & Assoc.

(57) ABSTRACT

An expedited data backup is performed by creating a duplicate set of pointers to a current dataset already identified by an original pointer set, then designating the dataset as a backup dataset, and thereafter preventing changes to the pointed-to-data and the duplicate pointers, where changes to the current dataset are nonetheless effected by storing new data and modifying the original pointer set alone. More specifically, the backup involves an original dataset having multiple subparts residing at various original storage locations, which are pointed-to by a primary set of pointers. A virtual backup copy is created by duplicating the primary set of pointers to create a backup set of pointers. The backup set of pointers are entered in a backup list, in association with the virtual backup copy and the original dataset. To preserve the backup copy, the system prevents changes to the original dataset and the backup set of pointers. When any changes are directed to subparts of the original dataset, the system creates a changed dataset by storing the changes at one or more change storage locations and updating the primary set of pointers to identify the change storage locations along with any original storage locations still containing unchanged subparts of the original dataset. In addition to expediting data backups, fast data recovery is possible by updating the primary set of pointers to duplicate the backup set of pointers.

21 Claims, 6 Drawing Sheets

METHOD AND APPARATUS FOR IMMEDIATE DATA BACKUP BY DUPLICATING POINTERS AND FREEZING POINTER/DATA COUNTERPARTS

BACKGROUND OF THE INVENTION

1. Field of the Invention

The present invention relates to digital data backup systems. More particularly, the invention concerns a technique for performing an expedited data backup by creating a duplicate set of pointers to a current dataset already identified by an original pointer set, then designating the dataset as a backup dataset, and thereafter preventing changes to the pointed-to-data and the duplicate pointers, where changes to the current dataset are nonetheless effected by storing new data and modifying the original pointer set alone.

2. Description of the Related Art

With the increasing tide of digital information today, computer users encounter more data than ever to transmit, receive, and process. Data transmission and receipt speeds are continually increasing with each new advance in modems, fiber optics, ISDN, cable television, and other technology. Processing speeds are similarly advancing, as evidenced by the frequent introduction new products by the microprocessor industry.

In addition to transmitting, receiving, and processing data, storing data is another critical need for many users. In fact, many users demand high performance data storage systems to contain huge amounts of data, and to quickly access the data. Engineers are constantly making significant improvements in their storage systems by reducing storage density and increasing storage speed.

For many businesses, data storage is such as critical function that data loss cannot be tolerated. As a result, different techniques and systems for data backup have become widespread. Some examples include the peer-to-peer remote copy system ("PPRC") and extended remote copy system ("XRC"), both developed by International Business Machines Corp. ("IBM").

In many applications, it is not only essential to have backup data, but to have quick recovery from backup data in the event of data failure. Some applications that rely on the ability to quickly access stored data include automated teller networks of banks, financial information of stock brokers, reservation systems of airlines, and the like. In applications such as these, slow recovery from failed data can mean lost revenue.

Data backup/recovery occurs in various contexts including an "on-line" environment and an "off-line" environment. In the on-line environment, stored data is continually available to users, and backup operations must therefore be conducted in the "background." This can slow users' access to their data, including operations such as storing new data, updating existing data, and retrieving stored data. From the user's perspective, slower data access is a disadvantage because it causes frustration and lengthens the time needed to complete projects that require data access. From the system manufacturer's perspective, slower data access is a disadvantage because it makes the storage system less competitive with other manufacturer's storage systems.

Aside from the backup completion time, another concern in the on-line environment is the time needed to recover from backup data when the original data fails. When stored data does fail, it is important to restore the data from the backup copy as quickly as possible. From the user's perspective, data recovery time is part of the data access time, which should be as brief as possible.

In the off-line context, data storage jobs are consolidated for more efficient processing together during a batch processing "window." The storage system usually goes "off-line" during the batch processing window, and is therefore unavailable to serve requests other than the pre-consolidated jobs being processed. Data backups may be performed regularly during the batch processing window, in serial fashion with the other jobs underway. Consequently, the data backups increase the overall size of the batch processing window, therefore lengthening the time that the system is unavailable to users.

Any off-line recovery that is required during the batch processing window similarly lengthens the time that the storage system is unavailable to users.

As shown above, a number of different backup systems already exist, and certain of these systems constitute significant advances and even enjoy widespread commercial success today. Nonetheless, IBM continually works to improve the performance and efficiency of data backup systems. Some areas of particular focus include minimizing the backup and recovery times in the on-line and off-line storage environments.

SUMMARY OF THE INVENTION

Broadly, the present invention concerns a technique for performing an expedited data backup. This is done by creating a duplicate set of pointers to a current dataset already identified by an original pointer set, then designating the dataset as a backup dataset, and thereafter preventing changes to the pointed-to-data and the duplicate pointers, where changes to the current dataset are nonetheless effected by storing new data and modifying the original pointer set alone.

More specifically, the backup involves an original dataset contained in a storage system. This dataset has multiple subparts residing at various original storage locations. The storage system uses a primary set of pointers to identify the original storage locations. The backup is started by duplicating the primary set of pointers to create a backup set of pointers. The backup set of pointers are entered in a backup list, in association with the backup dataset.

To preserve the backup data, the system prevents changes to the original dataset and the backup set of pointers. In response to receiving any changes to the original dataset, the system creates a changed dataset by storing the changes at one or more change storage locations and updating the primary set of pointers to identify the change storage locations and any original storage locations containing unchanged subparts of the original dataset.

To minimize the loss of data in the event of a failure, further backups are performed using similar techniques. Specifically, the modified original set of pointers are duplicated to create a second backup set of pointers. The system enters the second backup set of pointers in the backup list, in association with the backup dataset: Further changes to the changed dataset are prevented. In response to receipt of any further changes to the changed dataset, the system stores the further changes at one or more further changed locations and modifies the modified original set of pointers to identify the further changed storage locations and any original storage locations containing unchanged subparts of the original dataset.

In addition to expediting data backups, the invention speeds data recovery as well. In response to loss of a dataset, the system accesses the backup list and selects one of the listed backup datasets. Then, the selected backup is used to recover the lost dataset. This is rapidly achieved by updating the primary set of pointers to replicate the backup pointer set.

Accordingly, as shown above, one embodiment of the invention may be implemented to provide a method to perform an immediate data backup by duplicating pointers and freezing pointer/data counterparts. In another embodiment, the invention may be implemented to provide an apparatus, such as a data storage system, configured to perform an immediate data backup by duplicating pointers and freezing pointer/data counterparts. In still another embodiment, the invention may be implemented to provide a signal-bearing medium tangibly embodying a program of machine-readable instructions executable by a digital data processing apparatus to perform an immediate data backup by duplicating pointers and freezing pointer/data counterparts.

The invention affords its users with a number of distinct advantages. First, the invention expedites data backup operations. This minimizes system downtime, user waiting, and other undesirable effects of slow backup operations. Data recovery is likewise accelerated with this invention. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings. As mentioned above, the invention concerns a method for performing an immediate backup by duplicating pointers and freezing pointer/data counterparts. As discussed more completely below, this is achieved by creating a duplicate set of pointers to a current dataset already identified by an original pointer set, then designating the dataset as a backup dataset, and thereafter preventing changes to the pointed-to-data and the duplicate pointers. Changes to the current dataset are nonetheless effected by storing new data and modifying the original pointer set alone.

HARDWARE COMPONENTS & INTERCONNECTIONS

Storage System Structure

Figure 1:
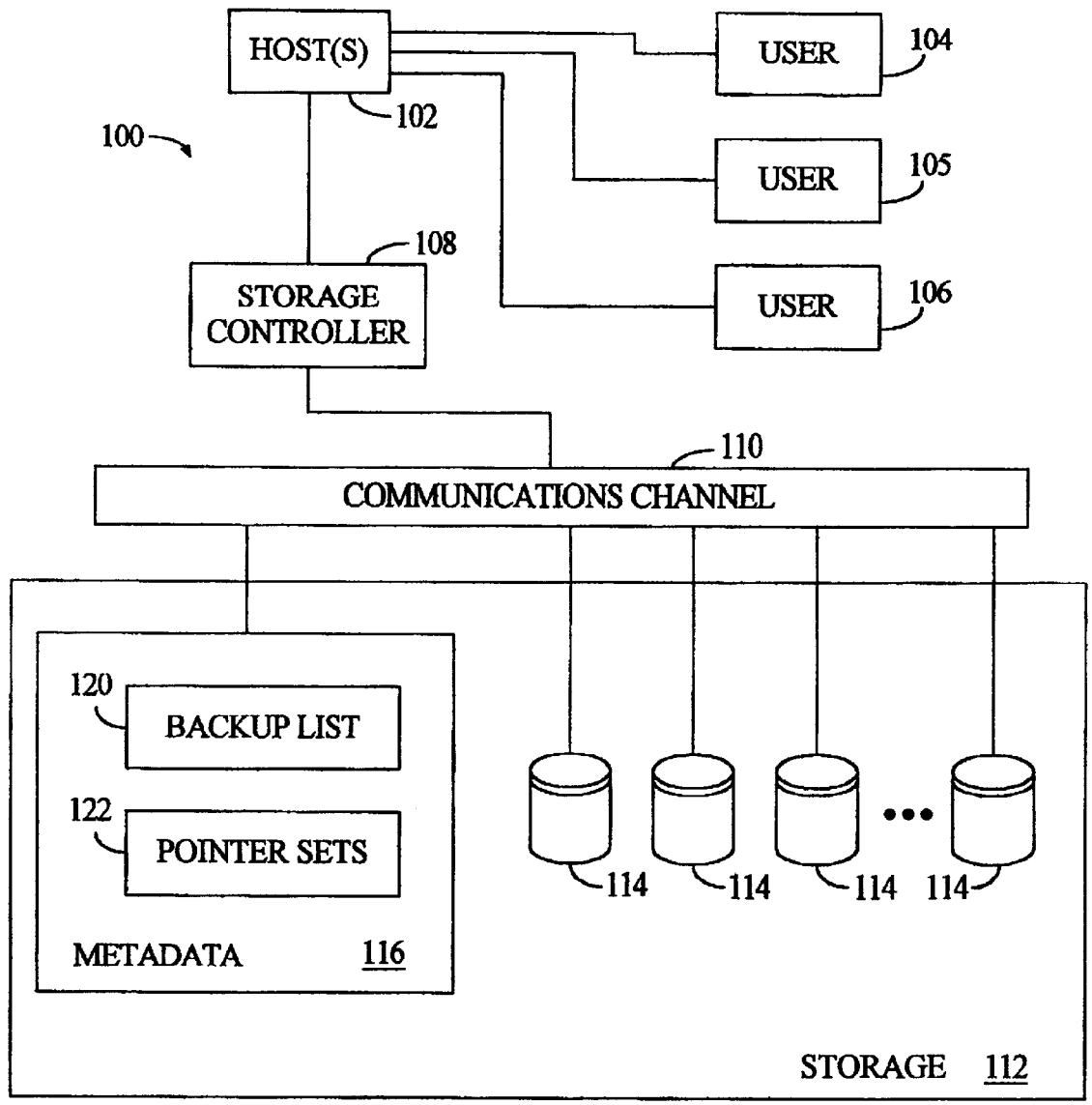
FIG. 1 is a block diagram of the hardware components and interconnections of a data storage system in accordance with the invention.

One aspect of the invention concerns a storage system, which may be embodied by various hardware components and interconnections, as shown by the exemplary system 100 of FIG. 1. The storage system 100 includes one or more hosts 102 coupled to a storage controller 108 and various users 104–106. For ease of explanation, the following description discusses the embodiment with a single host 102. The storage controller 108 is coupled to a storage 112, via a communications channel 110. Generally, the host 102 directs the storage controller 108 to store and retrieve data to serve the users 104–106, other computers (not shown), application programs of the host 102, and other sources. The host 102 regards stored data according to a high-level view, which may include one or more as "logical volumes," for example. The storage controller 108 translates between the logical view of the host 102 and a physical view of data that pertains to actual addresses, extents, tracks, sectors, cylinders, and the like.

Considering the components of FIG. 1 in more detail, the host 102 comprises a digital data processing machine such as a personal computer, mainframe computer, server, computer workstation, supercomputer, etc. As a specific example, the host 102 may be implemented by an IBM model S/390 machine. The users 104–106 may be human users, other computers, remote terminals, keyboards, server consoles, application programs, or other input sources.

In one example, some functions of the storage controller 108 may be performed by an IBM model 3990 storage controller, with some other functions being performed by processing hardware of an IBM model RAMAC RVA storage subsystem. In this embodiment, the storage 112 is provided by the storage media of the RAMAC RVA storage subsystem and includes multiple storage units 114, such as magnetic disk drive storage. The metadata storage 116 contains statistics about data contained on the storage units 114. The metadata 116 includes a backup list 120 and a list of pointer sets 122, discussed below. The metadata may also include, for example, lookup tables to assist the storage controller 108 in translating between logical and physical addresses, along with various tables and lists more thoroughly discussed below. The metadata 116 and its subcomponents may be implemented using any suitable hardware and/or software construct, such as buffers, registers, storage addresses, storage devices, etc.

The communications channel 110 provides a digital communications link between the storage controller 108 and the storage 112. The channel 110 may be provided by many different hardware arrangements, such as a small computer standard interface ("SCSI"), ESCON interface, intelligent bus, etc.

Exemplary Digital Data Processing Apparatus

Figure 2:
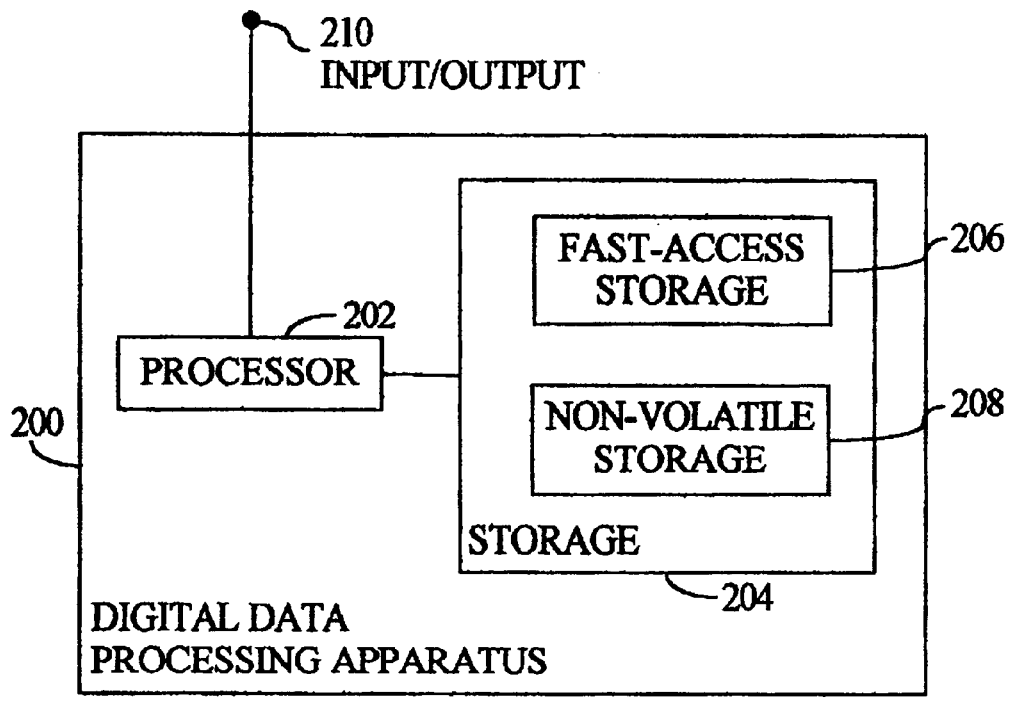
FIG. 2 is a block diagram of a digital data processing machine in accordance with the invention.

Another aspect of the invention concerns a digital data processing apparatus, provided to manage backup and recovery operations involving the storage 112. This apparatus may serve to implement the storage controller 108, the controller 108 and certain control hardware of the storage 112, or other components or combinations as needed. This apparatus may be embodied by various hardware components and interconnections, one example of which is shown in FIG. 2.

The apparatus 200 includes a processor 202, such as a microprocessor or other processing machine, coupled to a storage 204. In the present example, the storage 204 includes a fast-access storage 206, as well as nonvolatile storage 208.

The fast-access storage 206 may comprise random access memory ("RAM"), and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for exchanging data with the processor 202.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

OPERATION

In addition to the various hardware embodiments described above, a different aspect of the invention concerns a method for performing an immediate backup by duplicating pointers and freezing pointer/data counterparts. As discussed more completely below, this is achieved by creating a duplicate set of pointers to a current dataset already identified by an original pointer set, then designating the dataset as a backup dataset, and thereafter preventing changes to the pointed-to-data and the duplicate pointers, where changes to the current dataset are nonetheless effected by storing new data and modifying the original pointer set alone.

Signal-Bearing Media

In the context of FIGS. 1–2, such a method may be implemented, for example, by operating the storage controller 108, as embodied by a digital data processing apparatus 200, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to make an immediate backup by duplicating pointers and freezing pointer/data counterparts and/or recover from such a backup.

Figure 3:
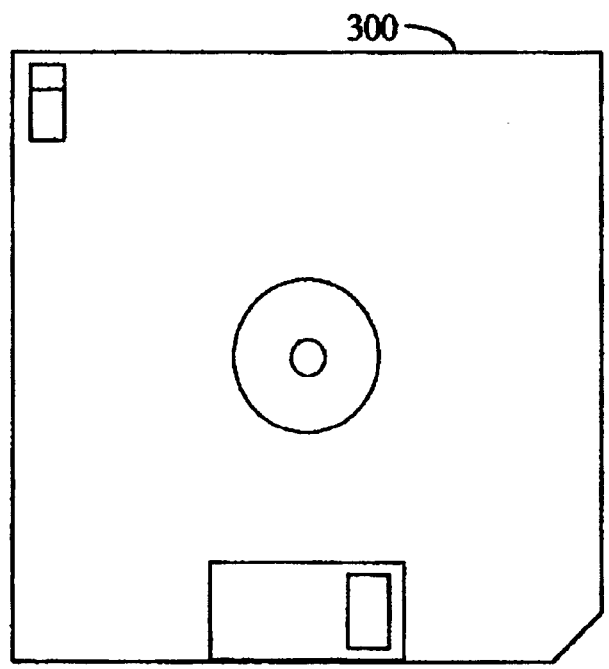
FIG. 3 shows an exemplary signal-bearing medium in accordance with the invention.

This signal-bearing media may comprise, for example, RAM (not shown) contained within the storage controller 108, as represented by the fast-access storage 206 of the apparatus 200. Alternatively, the instructions may be contained in another signal-bearing media, such as a magnetic data storage diskette 300 (FIG. 3), directly or indirectly accessible by the storage controller 108. Whether contained in the fast-access storage 206, diskette 300, storage 112, or elsewhere, the instructions may be stored on a variety of machine-readable data storage media, such as direct access storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C."

Snap Copy Technology—Storage Diagram

The invention incorporates certain aspects of "snap copy" technology which is a technique to quickly create a copy of data by duplicating the data's pointer set. Generally, with snap copying, data records are "copied" by creating a duplicate set of pointers referencing the original data record. This enables access to the data record via two virtual addresses while only a single physical copy of the data record actually resides in storage. "Snap copy" operations are discussed in greater detail in the following reference, which is incorporated herein by reference: U.S. Pat. No. 5,410,667 entitled "Data Record Copy System for a Disk Drive Array Data Storage Subsystem," issued on Apr. 25, 1995 to Belsan et al.

Figure 4A:
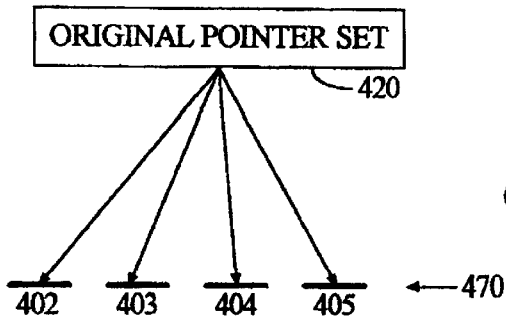
FIGS. 4A–4D are block diagrams showing pointer use involved in making a "snap" copy, as known in the art.

As explained below, snap copy provides some but not all of the features needed to backup data according to the invention. To aid in understanding the invention, FIGS. 4A–4D illustrate the operation of snap copy. Referring to FIG. 4A, an original dataset 470 is stored in multiple storage locations 402–405, also called "subparts." Each subpart may comprise an address, address range, group or selected addresses, block, partition, or other suitable region of storage. These storage locations 402–405 are identified by an original pointer set 420, which contains the locations' addresses. More particularly, each subpart of the dataset 470 is identified by a different pointer of the pointer set 420.

Figure 4B:
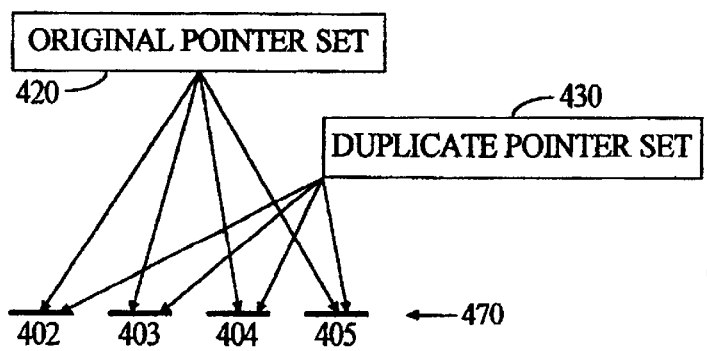
Figure 4C:
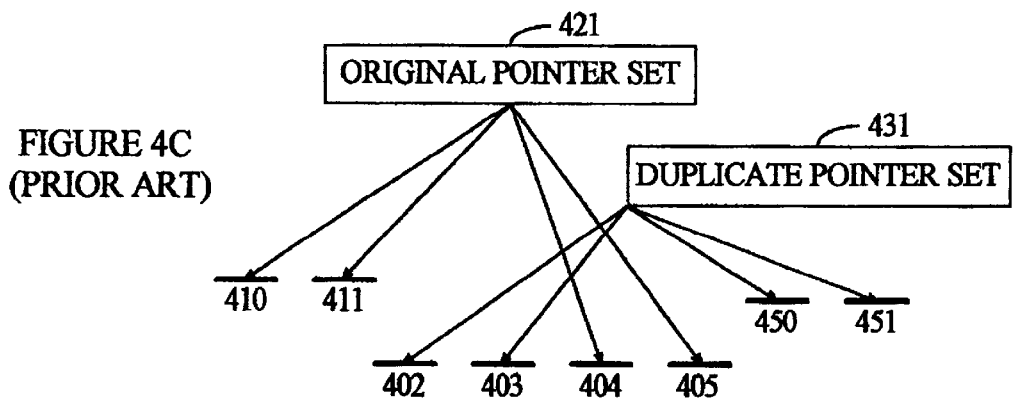
Figure 4D:
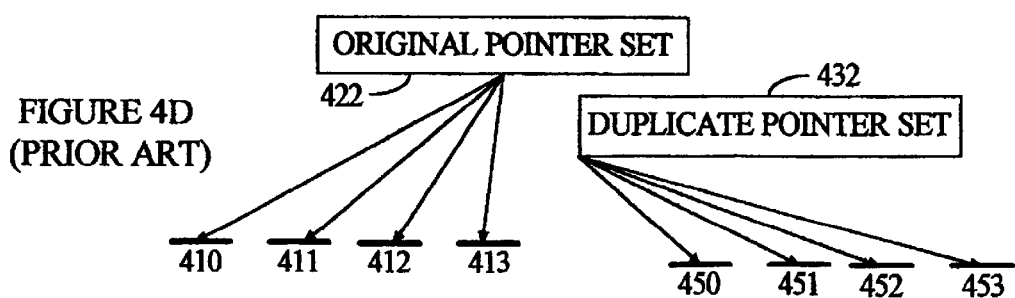

As shown by FIG. 4B, the snap copy is made by creating a duplicate pointer set 430, also pointing to the locations 402–405. At this point, there are two "virtual" copies of the dataset 470, an original dataset and a duplicate dataset. As the original dataset is modified, so is the original pointer set 420. For example, if the data of locations 402–403 in the original dataset are replaced with new data in locations 410–411, the original pointer set is modified as shown by 421 (FIG. 4C). Changes to the duplicate dataset are effected in the same way. For instance, if the data of locations 404–405 in the duplicate dataset are replaced with new data in locations 450–451, the duplicate pointer set 430 is modified as shown by 431 (FIG. 4C). After a sufficient number of changes, the original and duplicate datasets may diverge from each other completely, as shown in FIG. 4D. Moreover, the updated original pointer set 422 and duplicate pointer set 432 now identify storage locations (410–413 and 450–453) that are completely different than the storage locations (402–405) of the original dataset 470.

Backup and Restore Sequences—Explained by Storage Diagram

Figure 5A:
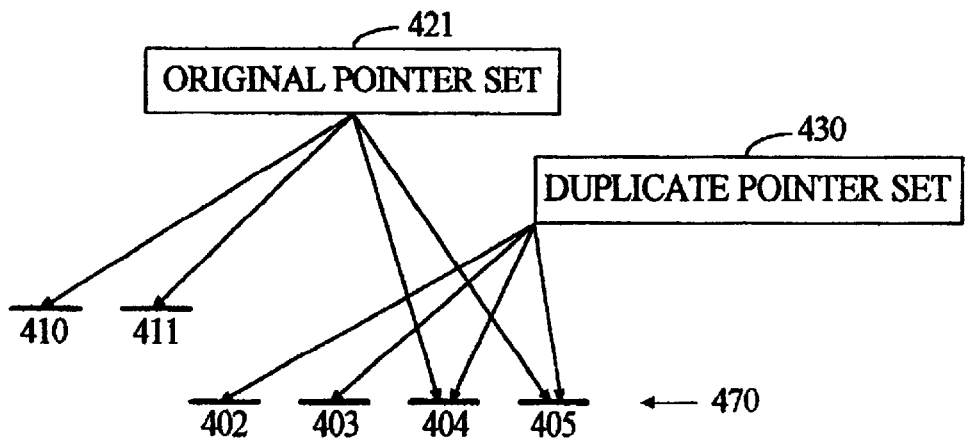
FIGS. 5A–5B are block diagrams showing pointer use involved in making an immediate backup copy by duplicating pointers and freezing the pointer/data counterparts in accordance with the invention.

The present invention creates a backup copy of data using a snap copy as illustrated in FIGS. 4A–4B. However, unlike the snap copy, the invention does not permit the duplicate pointer set and its associated data to diverge from the original dataset 470. In effect, the duplicate pointer set 430 and the data in storage locations 402–405 are frozen. As shown in FIG. 5A, changes are permitted to the original pointer set and its pointed-to data. The example of FIG. 5A shows a modified original pointer set 421 identifying some of the original locations 404–405, along with some new locations 410–411.

Figure 5B:
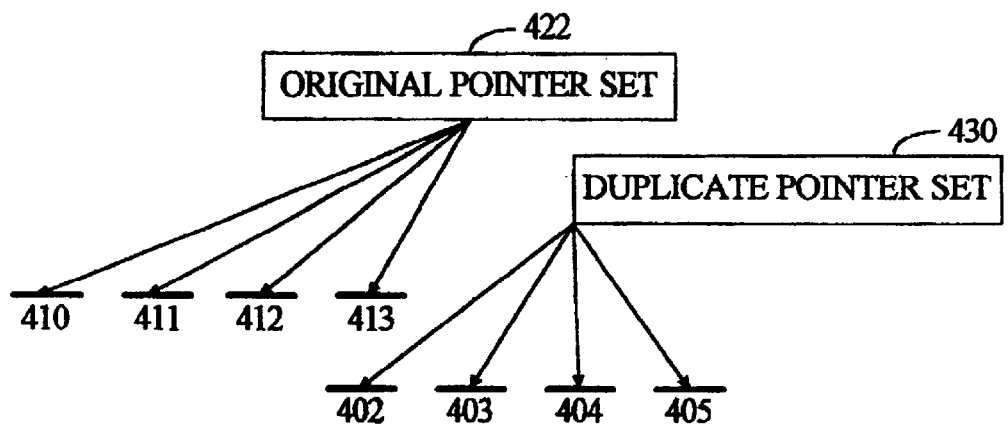

After a sufficient number of changes, the original dataset may diverge from the duplicate dataset completely, as shown in FIG. 5B. In this example, a series of data updates have resulted in an original pointer set 422 that now identifies storage locations 410–413 completely different from the original locations 402–405. However, only the pointer set 422 is permitted to identify storage locations completely different than the original dataset 420. The duplicate pointer set 430, which fixedly identifies an "internal backup" dataset, still points to the locations 402–405. Accordingly, these unchanged locations (402–405) serve as backup data, and are available to restore lost data. If the data 410–413 and/or original pointer set 422 are lost, the duplicate pointer set 430 is copied into the original pointer set 422, thereby resetting the original pointer set 422 to the original dataset's value at the time the internal backup was made using locations 402–405.

Metadata

In the illustrated example, the storage controller 108 uses metadata 116 including a backup list 120 and a pointer set list 122. The metadata 116 may also include a variety other information useful in managing the storage 112, as will be appreciated by those of ordinary skill in the art having the benefit of this disclosure.

As explained in greater detail below, the backup list 120 identifies all backups made from data contained in the storage 112. In the present example, such backups include "internal backups," created with the immediate backup and pointer/data freeze technique of the invention. Backups may also include "external backups," which are full, redundant copies of source data, stored separately from the source data. External backups may be kept on the storage 112, at a remote site, or elsewhere. External backups may be performed by new techniques, or various established methods known to those of ordinary skill in the art.

Table 1 (below) shows the contents of an exemplary backup list 120. The backup list identifies each backup by name, the name of the source dataset that is backed up, the type of backup (external or internal), the date and time of the backup, the backup's location (if external), and the address of the pointer set that identifies the backup (if internal).

TABLE 1

Backup List

| NAME OF BACKUP DATASET | NAME OF DATASET THAT IS BACKED-UP | TYPE | DATE/ TIME | LOCATION OF EXTERNAL BACKUP | POINTER SET AD- DRESS |
| --- | --- | --- | --- | --- | --- |
| DATASET-1 EXTERNAL BACKUP #1 | DATASET-1 | ext. | 1-1-98, 12:00 | off-site magnetic tape | n/a |
| DATASET-1, ENTERNAL BACKUP #1 | DATASET-1 | int. | 1-1-98, 13:00 | n/a | 0002 |
| DATASET-1, INTERNAL BACKUP #2 | DATASET-1 | int. | 1-1-98, 14:00 | n/a | 0003 |
| DATASET-2, INTERNAL BACKUP #1 | DATASET-2 | ext. | 1-1-98, 12:00 | tape library | n/a |

As shown above, the backup list's "pointer set address" column lists the address of each pointer set, where each pointer set includes pointers identifying an internal backup. Table 2 depicts a pointer set list 122. Each pointer set has an address, which is identified by the "pointer set address" of Table 1. Each pointer set corresponds to one internal backup, and its pointers identify the addresses that contain that internal backup.

TABLE 2

Pointer Sets

| POINTER SET ADDRESS | POINTER SET |
| --- | --- |
| 0001 | 1000, 1001, 1002, 1010, 1098, 2020 |
| 0002 | 2500, 2501 |
| 0003 | 3000, 3001, 3002, 3003, 3005 |

TABLE 2-continued

Pointer Sets

| POINTER SET ADDRESS | POINTER SET |
| --- | --- |
| 0004 | 1003, 2501, 3005, 3006 |
| 0005 | 9000, 9500, 9999 |

Backup Sequence—Explained by Flowchart

Figure 6:
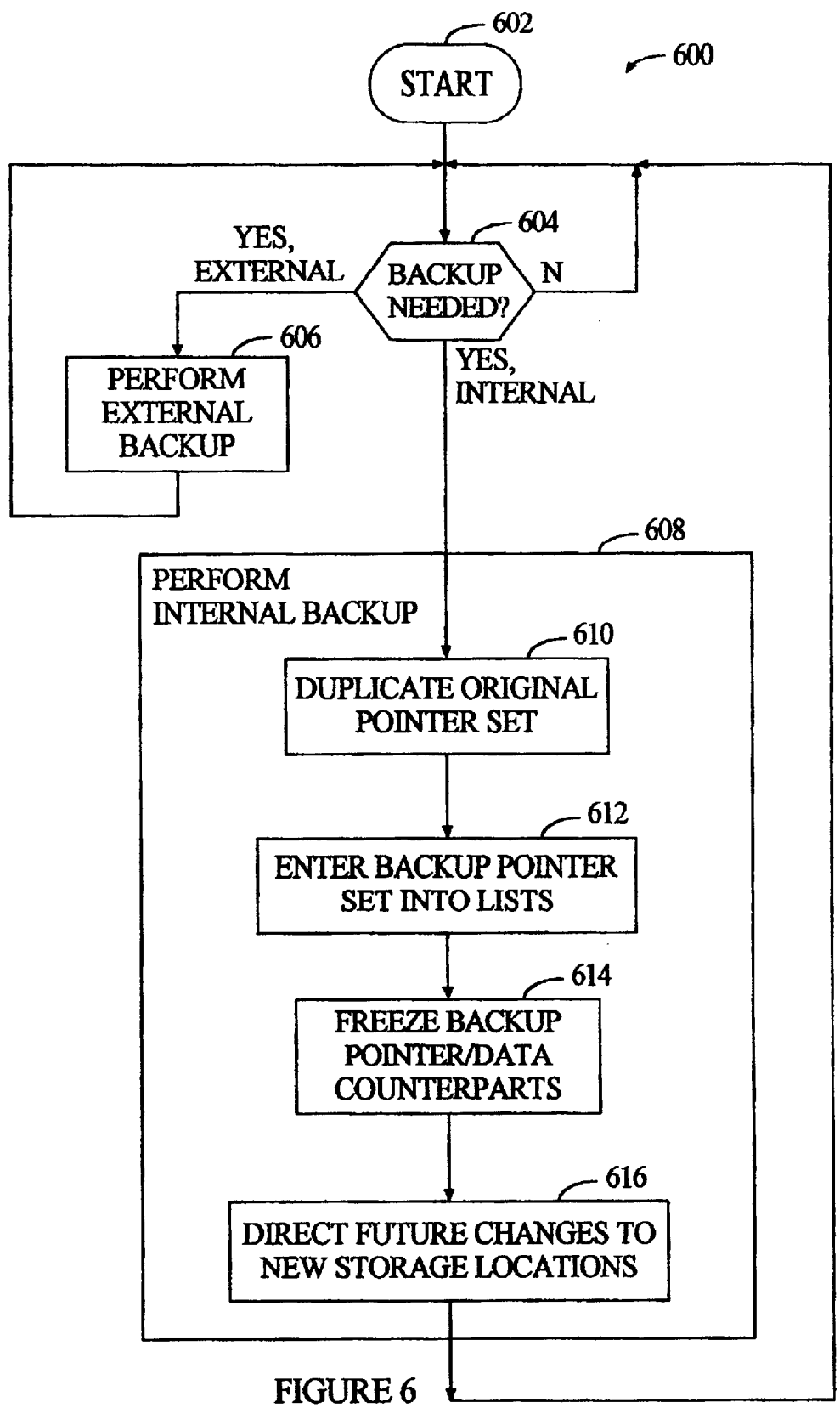
FIG. 6 is a flowchart of an operational routine for making an immediate backup copy by duplicating pointers and freezing the pointer/data counterparts in accordance with the invention.

FIG. 6 shows a sequence 600 to illustrate one example of the present invention's data backup method. For ease of explanation, but without any intended limitation, the example of FIG. 6 is described in the context of the storage system 100 described above (FIG. 1). The steps are initiated in step 602, when the system 100 is powered up, the backup facility of the invention is activated, or another suitable event. After step 602, the storage controller 108 consults a predetermined schedule to determine whether a backup is needed (step 604). This schedule may be constructed to trigger external and internal backups at any desired times. For example, external backups may be triggered according to a periodic schedule while the system 100 is running on-line, or when the system 100 first goes off-line to begin batch processing. Internal backups may be triggered periodically when the system is on-line, and between each batch storage job when the system 100 is off-line, for example.

If an external backup is needed, step 606 performs the backup by copying the source data to a location in the storage 112, another device, or even an off-site location. This may be done using a variety of known techniques, such as PPRC, XRC, etc. Step 606 also enters appropriate information about the external backup in the backup list 120 (Table 1).

In contrast, when an internal backup is needed, step 608 is performed. The dataset to be backed-up is called the "original dataset," and its pointer set is called the "original" or "primary" pointer set. First, in step 610 the storage controller 108 duplicates the original pointer set identifying the storage addresses of the original dataset in the storage 112). This creates a virtual backup copy of the original dataset. This step may be performed using a snap copy, as discussed above.

Next, in step 612 the storage controller 108 enters the duplicate pointer set ("backup pointer set") into the backup list 120 and the pointer set list 122. In step 614, the storage controller 108 "freezes" the backup pointer set and its pointed-to data. In other words, despite any future updates received, the storage controller 108 prevents any modification of the backup pointer set and its pointed-to data (i.e., the original dataset). In contrast, incoming updates to the original dataset are written to different storage locations in the storage 112, and appropriate changes are made to the original pointer set only.

After completion of step 606 or 608, control reverts to step 604.

Restore Sequence—Explained by Flowchart

Figure 7:
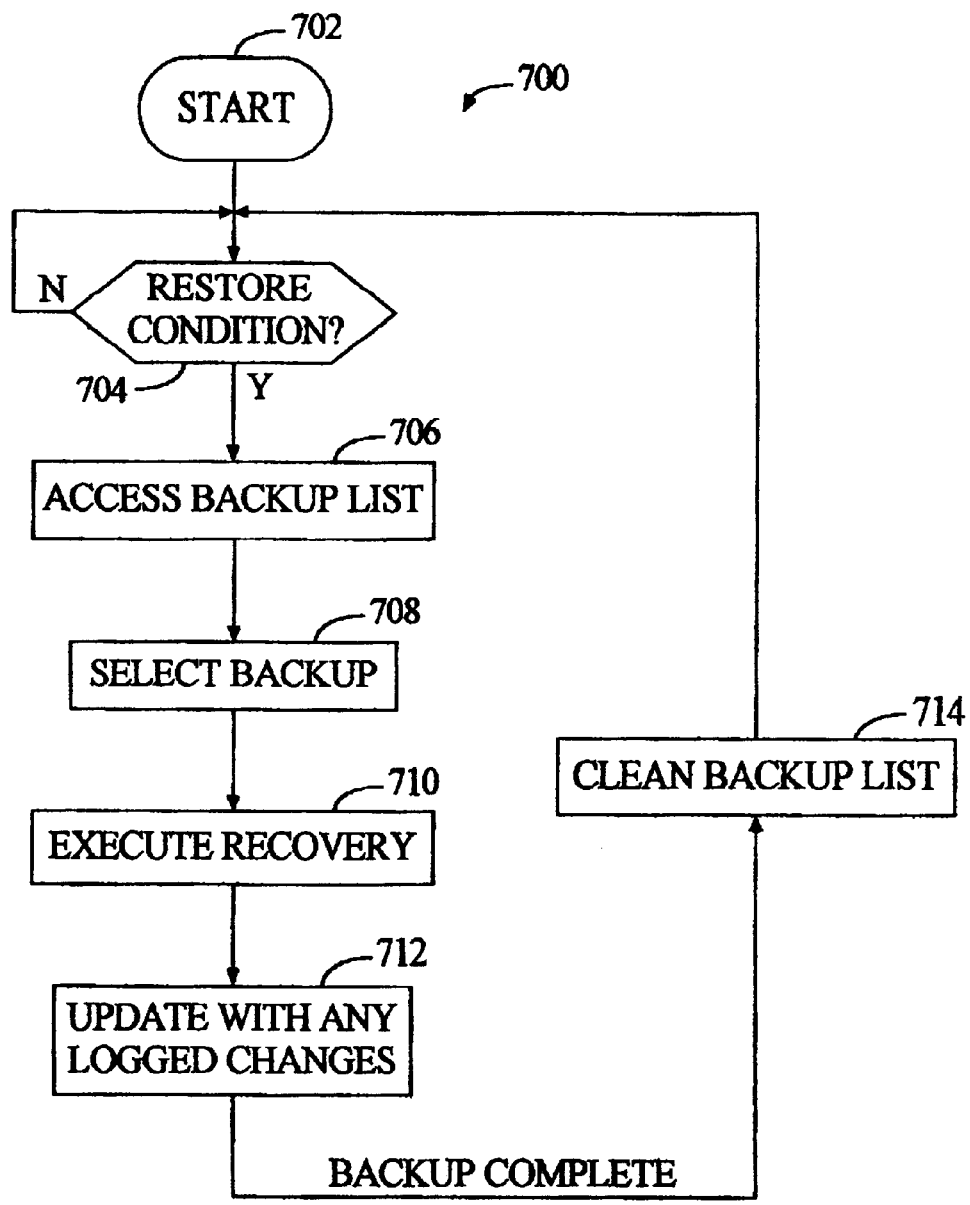
FIG. 7 is a flowchart of an operational routine for recovering data from an immediate backup copy, in accordance with the invention.

FIG. 7 shows a sequence 700 to illustrate one example of the present invention's method of restoring backed-up data. For ease of explanation, but without any intended limitation, the example of FIG. 7 is described in the context of the storage system 100 described above (FIG. 1). After step 702, the storage controller 108 asks whether a restore condition exists (step 704). A restore condition may be initiated by a user such as a system administrator, or automatically by the storage controller 108 or host upon detection of data corruption, failure of a device 114, failed communication with one of the devices 114, etc.

If a restore condition exists, the storage controller 108 accesses the backup list 120 (step 706) and selects the appropriate backup dataset for use in recovery (step 708). Selection of backup dataset may be done according to any predetermined criteria, such as a criteria that considers factors such as the recency of backup data, availability of backup data on-site, etc.

After selecting the backup dataset, the storage controller 108 executes recovery in step 710. In the case of an external backup, recovery may be preformed using known techniques adapted to this invention in a manner that should be apparent to ordinarily skilled artisans having the benefit of this disclosure. In the case of an internal backup, recovery is performed using the techniques of this invention, described as follows. Namely, the backup pointer set is used to replace the original pointer set of the failed data. Thus, the dataset is nearly instantly restored to the state of the data when the internal backup was made.

On a more detailed level, step 710 is accomplished by the storage controller 108 accessing the backup list 120 to find the location of the backup pointer set, and then consulting the pointer set list 122 to retrieve the duplicate pointers themselves. These pointers are then copied into the current pointer set of the failed dataset, residing in the pointer set list 122. The current pointer set of the failed dataset is the dataset's original pointer set (if no changes have been made to the dataset), or the dataset's modified original pointer set.

Following step 710, the storage controller 108 in step 712 updates the restored dataset with any changes that may have been logged. Again, no changes are made to the backup dataset or its pointer set, in case this information is needed again for future restore operations. After step 712, the recovery operation is complete.

At this point, having finished recovering and updating the backup dataset, the restored dataset itself is backed up in step 714. Also in step 714, the backup list 120 and pointer sets 122 may be modified to delete any backup datasets that were created after creation of the backup dataset used to perform recovery in step 710 (i.e., the backup dataset selected in step 708). These backup datasets are no longer valid. After step 714, the routine 700 returns to step 704 to await another restore condition.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method for backing up an original dataset contained in a storage system, the original dataset having multiple subparts residing at original storage locations, the storage system including a primary set of pointers identifying the original storage locations, the method comprising:

creating a virtual backup copy of the original dataset by duplicating the primary set of pointers to create a backup set of pointers;

storing a representation of the backup set of pointers in a backup list in association with the virtual backup copy and the original dataset;

preserving the backup copy by preventing changes to the original dataset and the backup set of pointers; and in response to receipt of any changes directed to subparts of the original dataset, creating a changed dataset by storing the changes at one or more first change storage locations and updating the primary set of pointers to identify the first change storage locations and any original storage locations containing unchanged subparts of the original dataset.

2. The method of claim 1, the method further comprising:

performing an external backup operation by duplicating the original dataset.

3. The method of claim 1, the method further comprising performing a second backup operation, comprising:

creating a virtual backup copy of the changed dataset by duplicating the updated set of pointers to create a second backup set of pointers;

in the backup list, storing a representation of the second backup set of pointers in association with the virtual backup copy of the changed dataset and the changed dataset;

preventing changes to the changed dataset and the updated set of pointers; and in response to receipt of any further changes to subparts of the changed dataset, storing the further changes at one or more second change storage locations and updating the updated set of pointers to identify the second change storage locations along with any first change storage locations and any original storage locations containing unchanged subparts of the updated dataset.

4. The method of claim 3, the method further comprising:

in response to a failure concerning the further changed dataset, accessing the backup list to identify a virtual backup copy associated with the changed dataset; and recovering the changed dataset in place of the further changed dataset by copying the second backup set of pointers into the primary set of pointers.

5. The method of claim 1, the method further comprising recovering data using the backup dataset, comprising:

in response to a predetermined condition, accessing the backup list and selecting one of the virtual backup copies; and recovering data backed up by the selected virtual backup copy using subparts pointed-to by the backup pointer set of the selected virtual backup copy.

6. The method of claim 1, the method further including using the virtual backup copy to recover from loss of the changed dataset, comprising:

updating the primary set of pointers to duplicate the backup set of pointers.

7. The method of claim 1, the method further comprising:

in response to a failure concerning the changed dataset, accessing the backup list to identify a virtual backup copy associated with the original dataset; and recovering the original dataset in place of the changed dataset by copying the backup set of pointers into the primary set of pointers.

8. A signal-bearing medium tangibly embodying a program of machine-readable instructions executable by a digital processing apparatus to perform a method for backing up an original dataset contained in a storage system, the original dataset having multiple subparts residing at original storage locations, the storage system including a primary set of pointers identifying the original storage locations, the method comprising:

creating a virtual backup copy of the original dataset by duplicating the primary set of pointers to create a backup set of pointers;

storing a representation of the backup set of pointers in a backup list in association with the virtual backup copy and the original dataset;

preserving the backup copy by preventing changes to the original dataset and the backup set of pointers; and in response to receipt of any changes directed to subparts of the original dataset, creating a changed dataset by storing the changes at one or more first change storage locations and updating the primary set of pointers to identify the first change storage locations and any original storage locations containing unchanged subparts of the original dataset.

9. The medium of claim 8, the method further comprising:

performing an external backup operation by duplicating the original dataset.

10. The medium of claim 8, the method further comprising performing a second backup operation, comprising:

creating a virtual backup copy of the changed dataset by duplicating the updated set of pointers to create a second backup set of pointers;

in the backup list, storing a representation of the second backup set of pointers in association with the virtual backup copy of the changed dataset and the changed dataset;

preventing changes to the changed dataset and the updated set of pointers; and in response to receipt of any further changes to subparts of the changed dataset, storing the further changes at one or more second change storage locations and updating the updated set of pointers to identify the second change storage locations along with any first change storage locations and any original storage locations containing unchanged subparts of the updated dataset.

11. The medium of claim 10, the method further comprising:

in response to a failure concerning the further changed dataset, accessing the backup list to identify a virtual backup copy associated with the changed dataset; and recovering the changed dataset in place of the further changed dataset by copying the second backup set of pointers into the primary set of pointers.

12. The medium of claim 8, the method further comprising recovering data from the backup dataset, comprising:

in response to a predetermined condition, accessing the backup list and selecting one of the virtual backup copies; and recovering data backed up by the selected virtual backup copy using subparts pointed-to by the backup pointer set of the selected virtual backup copy.

13. The medium of claim 8, the method further including using the virtual backup copy to recover from loss of the change dataset, comprising:

updating the primary set of pointers to duplicate the backup set of pointers.

14. The medium of claim 8, the method further comprising:

in response to a failure concerning the changed dataset, accessing the backup list to identify a virtual backup copy associated with the original dataset; and recovering the original dataset in place of the changed dataset by copying the backup set of pointers into the primary set of pointers.

15. A computer-driven backup system, comprising:

a data storage containing an original dataset having multiple subparts residing at original storage locations, the storage also containing a primary set of pointers identifying the original storage locations; and a storage controller coupled to the storage and programmed to back up the original dataset by performing operations comprising:

creating a virtual backup copy of the original dataset by duplicating the primary set of pointers to create a backup set of pointers;

storing a representation of the backup set of pointers in a backup list in association with the virtual backup copy and the original dataset;

preserving the backup copy by preventing changes to the original dataset and the backup set of pointers; and in response to receipt of any changes directed to subparts of the original dataset, creating a changed dataset by storing the changes at one or more first change storage locations and updating the primary set of pointers to identify the first change storage locations and any original storage locations containing unchanged subparts of the original dataset.

16. The system of claim 15, the storage controller being further programmed to perform operations comprising:

performing an external backup operation by duplicating the original dataset.

17. The system of claim 15, the storage controller being further programmed to perform a second backup operation, comprising:

creating a virtual backup copy of the changed dataset by duplicating updated set of pointers to create a second backup set of pointers;

in the backup list, storing a representation of the second backup set of pointers in association with the virtual backup copy of the changed dataset and the changed dataset;

preventing changes to the changed dataset and the updated set of pointers; and in response to receipt of any further changes to subparts of the changed dataset, storing the further changes at one or more second change storage locations and updating the updated set of pointers to identify the second change storage locations along with any first change storage locations along with any first change storage locations and any original storage locations containing unchanged subparts of the updated dataset.

18. The system of claim 17, the storage controller being further programmed to perform operations comprising:

in response to a failure concerning the further changed dataset, accessing the backup list to identify a virtual backup copy associated with the changed dataset; and recovering the changed dataset in place of the further changed dataset by copying the second backup set of pointers into the primary set of pointers.

19. The system of claim 15, the storage controller being further programmed to recover data using the backup dataset, comprising:

in response to a predetermined condition, accessing the backup list and selecting one of the virtual backup copies; and recovering data backed up by the selected virtual backup copy using subparts pointed-to by the backup pointer set of the selected virtual backup copy.

20. The system of claim 15, storage controller being further programmed to use the virtual backup copy to recover from loss of the change dataset, comprising:

updating the primary set of pointers to duplicate the backup set of pointers.

21. The system of claim 15, the storage controller being further programmed to perform operations comprising:

in response to a failure concerning the changed dataset, accessing the backup list to identify a virtual backup copy associated with the original dataset; and recovering the original dataset in place of the changed dataset by copying the backup set of pointers into the primary set of pointers.

* * * * *

UNITED STATES PATENT AND TRADEMARK OFFICE
CERTIFICATE OF CORRECTION

PATENT NO.   : 6,226,759 B1
DATED        : May 1, 2001
INVENTOR(S)  : Donald Lee Miller and Mark Anthony Sovik It is certified that error appears in the above-identified patent and that said Letters Patent is hereby corrected as shown below:

<u>Column 7,</u>
Line 43, Table 1, second item in column entitled "Name of Backup Dataset," replace "ENTERNAL" with -- INTERNAL --.
Line 48, Table 1, fourth item in column entitled "Name of Backup Dataset," replace "INTERNAL" with -- EXTERNAL--.

<u>Column 12,</u>
Lines 52 through 53, following the word "locations," delete "along with any first change storage locations."

Signed and Sealed this

Twentieth Day of August, 2002

Attest:

Attesting Officer

JAMES E. ROGAN
Director of the United States Patent and Trademark Office